(12) United States Patent
Myers

(10) Patent No.: US 11,944,994 B2
(45) Date of Patent: Apr. 2, 2024

(54) DEVICE OR SYSTEM FOR CREATING A VAPOUR FILLED BUBBLE

(71) Applicant: JetChill Ltd, Newcastle Upon Tyne (GB)

(72) Inventor: Colin Myers, Woodham (GB)

(73) Assignee: JetChill Ltd, Newcastle upon Tyne (GB)

( * ) Notice: Subject to any disclaimer, the term of this patent is extended or adjusted under 35 U.S.C. 154(b) by 701 days.

(21) Appl. No.: 16/554,365

(22) Filed: Aug. 28, 2019

(65) Prior Publication Data

US 2020/0070191 A1    Mar. 5, 2020

(30) Foreign Application Priority Data

Aug. 28, 2018    (GB) .................................... 1813987

(51) Int. Cl.
| | |
|---|---|
| *B05B 7/16* | (2006.01) |
| *A47J 31/00* | (2006.01) |
| *A47J 31/44* | (2006.01) |
| *B05B 7/00* | (2006.01) |

(52) U.S. Cl.
CPC ............ *B05B 7/1686* (2013.01); *A47J 31/00* (2013.01); *A47J 31/44* (2013.01); *B05B 7/0075* (2013.01)

(58) Field of Classification Search
CPC ...... B05B 7/1686; B05B 7/0075; A47J 31/00; A47J 31/44; A23F 3/00; A23F 5/00; A63H 33/28
See application file for complete search history.

(56) References Cited

U.S. PATENT DOCUMENTS

| | | | | | |
|---|---|---|---|---|---|
| 2,919,070 | A | * | 12/1959 | Arant ...................... | B08B 3/026 239/137 |
| 2,942,787 | A | * | 6/1960 | Bok ........................ | B05B 7/162 239/128 |
| 5,205,771 | A | * | 4/1993 | Sims ...................... | A63H 33/28 446/25 |
| 5,693,266 | A | * | 12/1997 | Jung ........................ | F24F 6/12 261/80 |
| 6,008,482 | A | * | 12/1999 | Takahashi ............ | H05B 6/6488 219/601 |
| 6,793,205 | B2 | * | 9/2004 | Eom .................... | B05B 17/0676 261/142 |
| 7,434,791 | B2 | * | 10/2008 | Weon ........................ | F24F 6/02 261/81 |
| 9,156,041 | B1 | * | 10/2015 | Mancinho ................. | F41H 9/06 |

(Continued)

FOREIGN PATENT DOCUMENTS

| | | | |
|---|---|---|---|
| CN | 204973082 U | * | 1/2016 |
| EP | 3181242 A1 | * | 6/2017 |

(Continued)

*Primary Examiner* — Bob Zadeh
(74) *Attorney, Agent, or Firm* — Renner, Otto, Boisselle & Sklar, LLP

(57) ABSTRACT

A device creates a vapor filled bubble. The device includes a dispensing nozzle including a liquid retention formation for assisting bubble creation, an air displacement element; a vapor producing means, which includes a source of vapor producing liquid, and a means for heating the liquid. The air displacement element is arranged to provide airflow through the vapor producing means to produce vapor for delivery to the dispensing nozzle.

14 Claims, 3 Drawing Sheets

(56) References Cited

U.S. PATENT DOCUMENTS

| | | | |
|---|---|---|---|
| 2002/0061697 A1* | 5/2002 | Hornsby | A63H 33/28 |
| | | | 446/15 |
| 2002/0086259 A1* | 7/2002 | Shirakawa | H01L 21/67109 |
| | | | 118/725 |
| 2003/0228824 A1* | 12/2003 | Thai | A63H 33/28 |
| | | | 446/15 |
| 2004/0142626 A1* | 7/2004 | Choi | A63H 33/28 |
| | | | 446/15 |
| 2005/0148276 A1* | 7/2005 | LaFata | A63H 33/26 |
| | | | 446/18 |
| 2018/0029782 A1* | 2/2018 | Zuber | B65D 83/384 |
| 2018/0263222 A1* | 9/2018 | Oster | A01M 13/00 |
| 2020/0070191 A1* | 3/2020 | Myers | A23F 5/00 |

FOREIGN PATENT DOCUMENTS

| | | | | |
|---|---|---|---|---|
| JP | 3754113 B2 * | 3/2006 | | |
| WO | WO-2018037206 A1 * | 3/2018 | | A24F 40/00 |

* cited by examiner

DEVICE OR SYSTEM FOR CREATING A VAPOUR FILLED BUBBLE

FIELD

The present disclosure relates to devices for preparing refreshments, particularly in preparation of beverages with additional features designed to enhance the experience of the beverage consumer, particularly in the adult entertainment industry.

BACKGROUND

The hospitality industry continues to grow more competitive, with an increasing number of venues for the consumer to select from. One of the key methods of distinguishing a particular venue's services from another, thereby encouraging a greater share of the consumer base, is to produce distinctive refreshments. Specifically, in the case of bars and restaurants, beverages which have distinctive character.

Particularly, herein disclosed is a system designed to prepare and place a vapour filled bubble onto a beverage container. The vapour may have an aromatic scent to enhance the consumers experience when consuming the beverage, as the bubble bursts the aromatic scent may float on the surface of the drink adding to the smell and taste of the said beverage. The disclosed technology is not limited to the use on beverages alone, but may be used on a number of foodstuffs, and other uses.

SUMMARY

The present application discloses a device for creating a vapour filled bubble, comprising: a dispensing nozzle including a liquid retention formation for assisting bubble creation; an air displacement element; a vapour producing means comprising a source of vapour producing liquid and a means for heating the liquid; wherein the air displacement element is arranged to provide airflow through the vapour producing means to produce vapour for delivery to the dispensing nozzle. The arrangement provides a system for the creation of vapour filled bubbles to accompany refreshments.

Optionally or additionally, the device may further comprise a controller suitable for varying the rate of airflow through the air motivating element. In an embodiment, the vapour producing means may comprise a heating element for heating the vapour producing liquid.

In another embodiment, the vapour producing element may comprise: an absorbent material arranged to become saturated with the vapour producing fluid; a source for the vapour producing fluid; and a heating element arranged to heat the vapour producing fluid therein; wherein the fluid and absorbent material are configured such that the fluid does not drip from the absorbent material when saturated. Said absorbent material 5 could be cotton, silica, wool, steel mesh, or any absorbent material suitable for use with the vapour producing liquid. The vapour producing liquid may comprise propylene glycol and vegetable glycerin, or other appropriate fluids.

In yet another embodiment, the heating element may be powered by a controller using a high frequency signal. The advantage of using a high frequency signal over a constant voltage is in energy used by the device or system in order to extend the user time from an internal power source.

In an embodiment, the device may further comprise a liquid storage tank or reservoir that is removably or non-removably connected to the device or system. A removable tank or reservoir will enable the user to change flavours for different beverages, without the need to have multiple devices.

In another embodiment, the dispensing nozzle may comprise a liquid retention formation comprising interlocking raised profiles and grooves suitable for increasing the surface area of the liquid retention formation to ensure a good supply of bubble making solution for the formation of a bubble filled with a vapour.

The components of the device may be contained or attached to a housing, configured to enclose at least: the tank or reservoir; heating element; and air displacement element, in another embodiment.

Optionally or additionally the device may be provided with a bowl suitable for containing a bubble solution and configured to accept the liquid retention system.

A device or system for creating a vapour filled bubble, comprising a body to house all the internal parts, making the device portable, internal parts will work together to produce a vapour filled bubble by moving air with the aid of a fan or blower means, this air is passed via a sealed duct into a vapour producing means in order to produce a vapour source that is passed via a sealed duct to a dispensing nozzle containing a liquid retention system for the production a vapour filled bubble.

A device or system for creating a vapour filled bubble, further comprising a fan or blower means controlled by a controller to control the speed of the fan or blower means.

A device or system for creating a vapour filled bubble, further comprising a vapour producing means, this may be a system that uses a coil that is heated up using a high frequency signal from a controller, the advantage of using a high frequency signal over a constant voltage is in energy used by the device or system in order to extend the user time from the internal battery. The vapour producing means is not limited to a coil and could use any means currently available to produce a vapour in an air source.

A device or system for creating a vapour filled bubble, further comprising a liquid storage tank or reservoir that is permanently connected to or removable from the device or system, a removable tank or reservoir will enable the user to change flavours for different beverages, without the need to have multiple devices.

A device or system for creating a vapour filled bubble, further comprising a dispensing nozzle containing a liquid retaining grove with interlocking raised profiles and grooves in order to increase the surface area of the liquid retaining grove to ensure a good supply of bubble making solution for the formation of a bubble filled with a vapour.

DETAILED DESCRIPTION OF CERTAIN EMBODIMENTS

The embodiments described herein are provided for sufficiency of disclosure of the subject matter for which protection is being sought, and are not intended as being limiting in scope.

Figure 1:
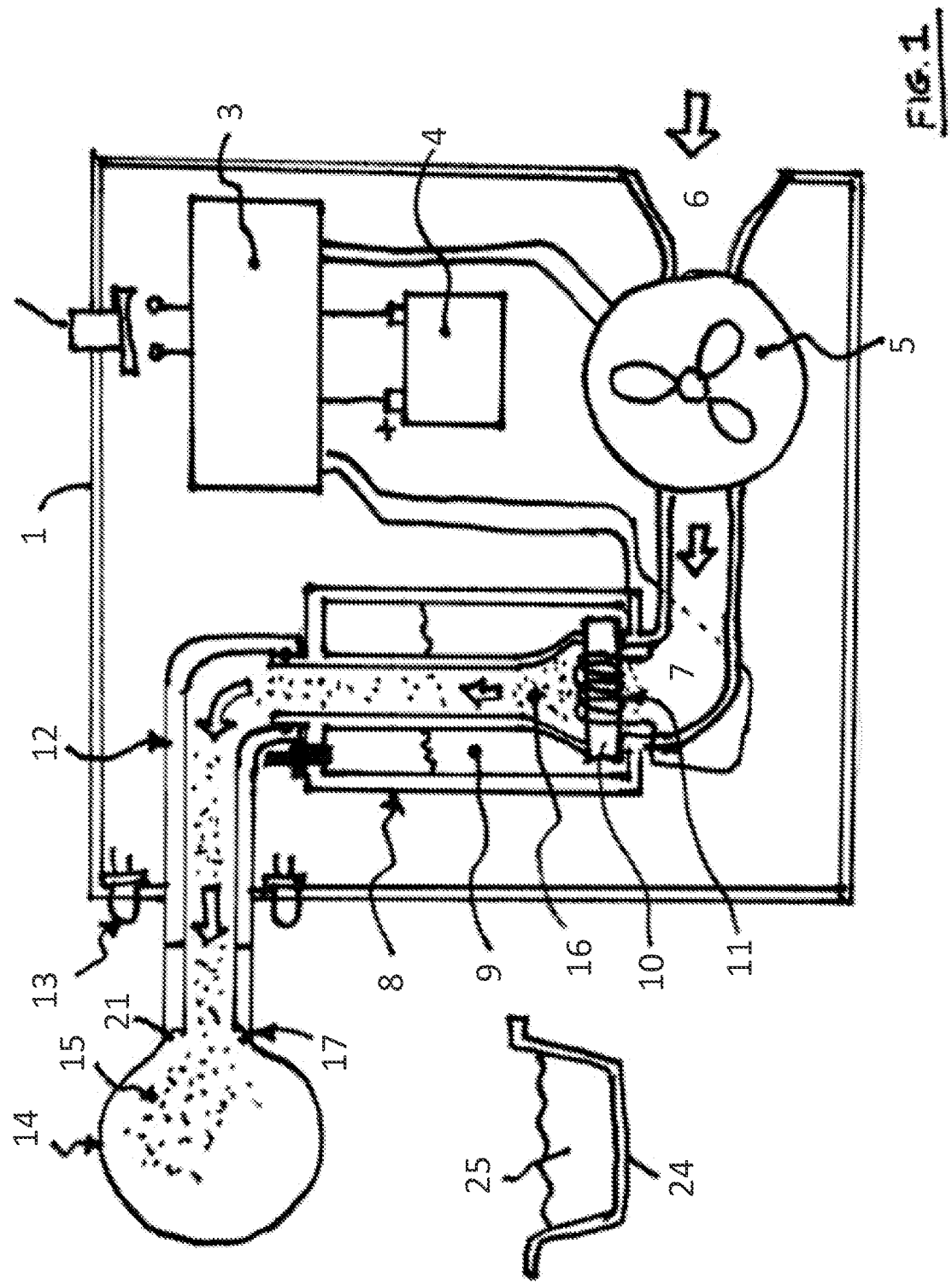
FIG. 1 shows an illustrative embodiment of the device in operation.

In the illustrative embodiment of FIG. 1, the device may comprise a body (1), suitable to house the internal parts, making the device portable. A push or start button (2) to activate the system. Once button (2) has been pressed by the user, it sends a signal to the control board (3) which turns on an air motivating element (5), and sends a high frequency signal to the heating element (11) within the vapour producing element. The heating element (11) may have an absorbent type material (10) running through the centre of it, this may allow the vapour fluid (9) contained in the reservoir tank (8) to make contact with the heating element (11) in order to create vapour in the air flow (7) being generated by the air motivating element (5), but not allowing the vapour fluid (9) to leak into the air ducting system of the air motivating element (5). Once the vapour (16) has been generated it is carried up a sealed duct (12) to the dispensing nozzle (17) which comprises a liquid 5 retaining system (21) that may have a bubble making solution (25) entrapped within it. The user will normally dip the nozzle (17) into a small bowl (24) containing a bubble solution (25) before starting the device. As the vapour flows into the bubble solution held in the retention formation(21) a bubble (14) is formed and filled with a vapour (15) the size of the bubble may be determined by the length of time the user presses the start button (2).

Figure 2:
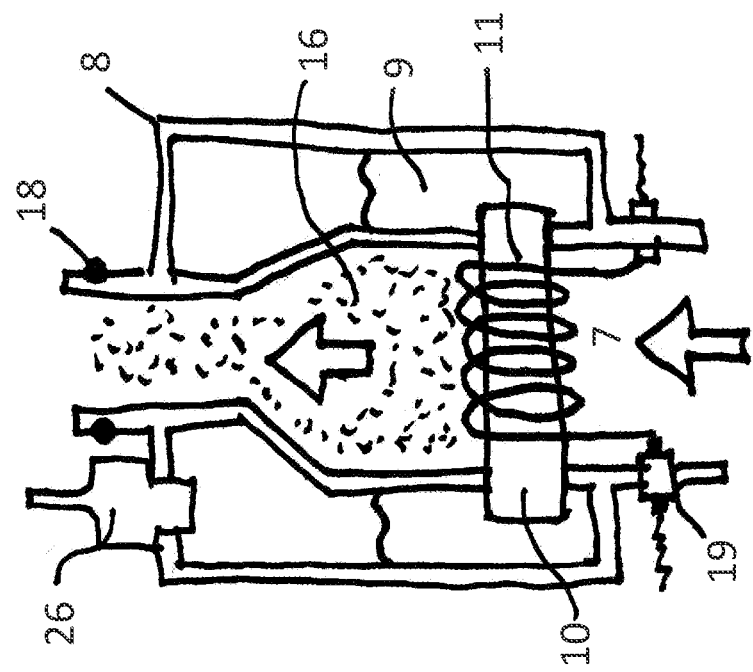
FIG. 2 shows an embodiment of an arrangement configured to produce vapour.

FIG. 2 shows a system and method suitable for producing vapour. The Vapour liquid (9) is held in a tank (8) which houses a heating element (11) and absorbent material (10) running through the centre of the heating element (11) and located in the vapour liquid (9) in the base of the tank via holes in the tank wall, this allows the absorbent material (10) to pass vapour fluid (9) to the heating element (11) without the liquid leaking into the air duct (7). The tank or reservoir (8) may be fixed or removable from the main body (1) and can be filled by removing a filler type plug (26). The heating element (11) could be permanently connected to the controller (3) if the tank or reservoir (8) is not removable from the main body (1) or could have a spring loaded type connector (19) to make connection with the heating element (11) housed in the tank or reservoir (8) if said tank or reservoir (8) is removable. The advantage of a removable tank or reservoir (8) is it will enable the user to change flavours for different beverages, without the need to have multiple devices.

Figure 3:
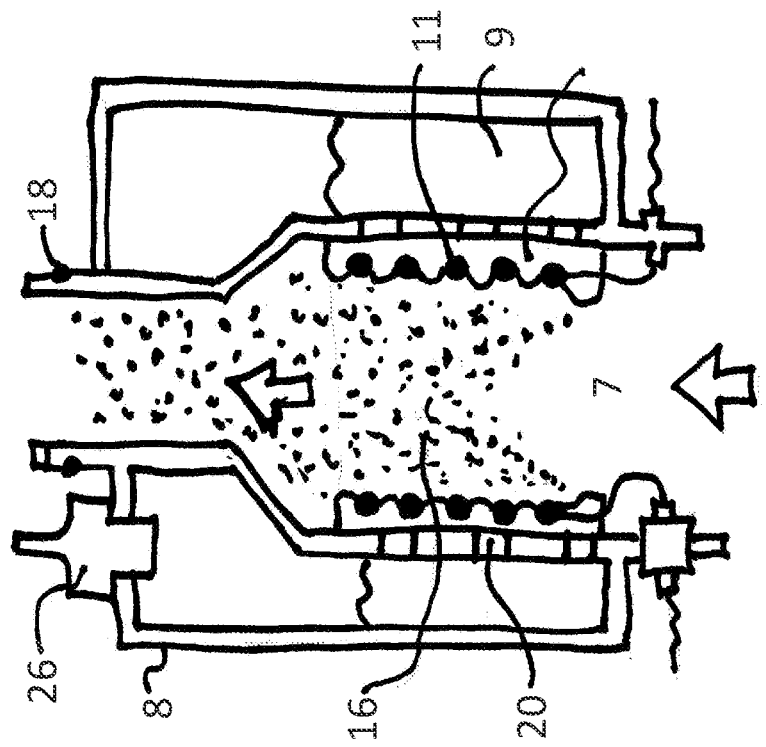
FIG. 3 shows a second embodiment of an arrangement configured to produce vapour.

FIG. 3 shows a second system and method suitable for producing vapour. The Vapour liquid (9) is held in a tank (8) which houses a heating element (11) and absorbent material (10) running around the outside of the heating element (11). The heating element (11) could be twice the size of the heating element (11) as shown in FIG. 2, therefore producing far more vapour (16) than a smaller heating element (11), and makes contact with the vapour liquid (9) in the tank via holes (20) in the tank or reservoir wall, this allows the absorbent material (10) to pass vapour fluid (9) to the heating element (11) without the liquid leaking into the air duct (7). The tank or reservoir (8) may be fixed or removable from the main body (1) and can be filled by removing a filler type plug (26). The heating element (11) could be permanently connected to the controller (3) if the tank or reservoir (8) is not removable from the main 35 body (1) or could have a spring loaded type connector (19) to make connection with the heating element (11) housed in the tank or reservoir (8) if said tank or reservoir (8) is removable. The advantage of a removable tank or reservoir (8) is it will enable the user to change flavours for different beverages, without the need to have multiple devices.

Figure 4:
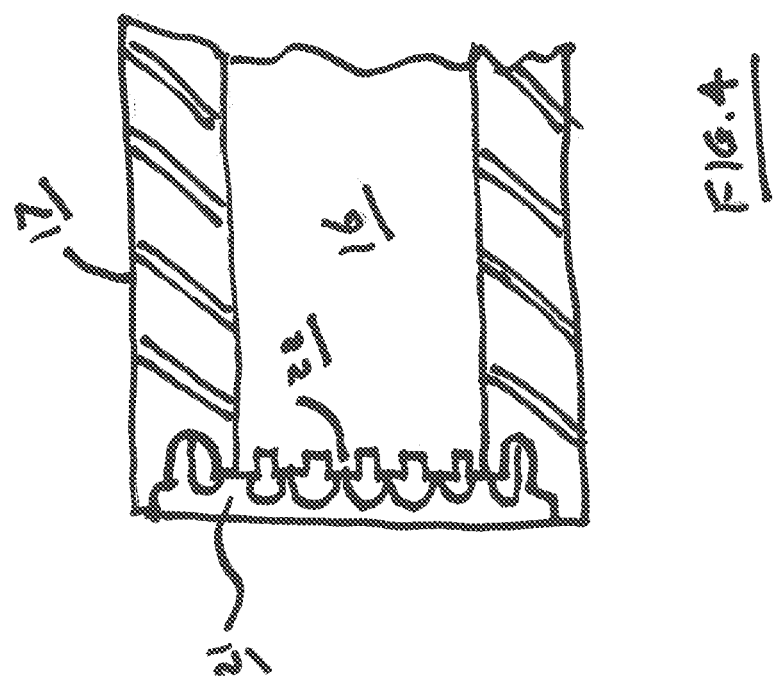
FIG. 4 shows a cross sectional view of an embodiment of the dispensing nozzle.

FIG. 4 shows a detailed cross sectional view of the dispensing nozzle (17) the fluid retention formation (21) carries the bubble making solution (25) that 5 is required in order to produce a bubble (14), because of a capillary type action the bubble making solution (25) is retained around the design of the liquid retention formation (21) with the aid of raised profiles (21) and groves (22) the design of the raised profile (21) and groves (22) will increase the surface area of the liquid retention formation (21) but also maintain a good liquid retention around 10 the whole design of the liquid retention formation (21) in order to supply a good source of bubble making solution (25) to the vapour source (16) forming the bubble (14) from the bubble making solution (25).

Figure 5:
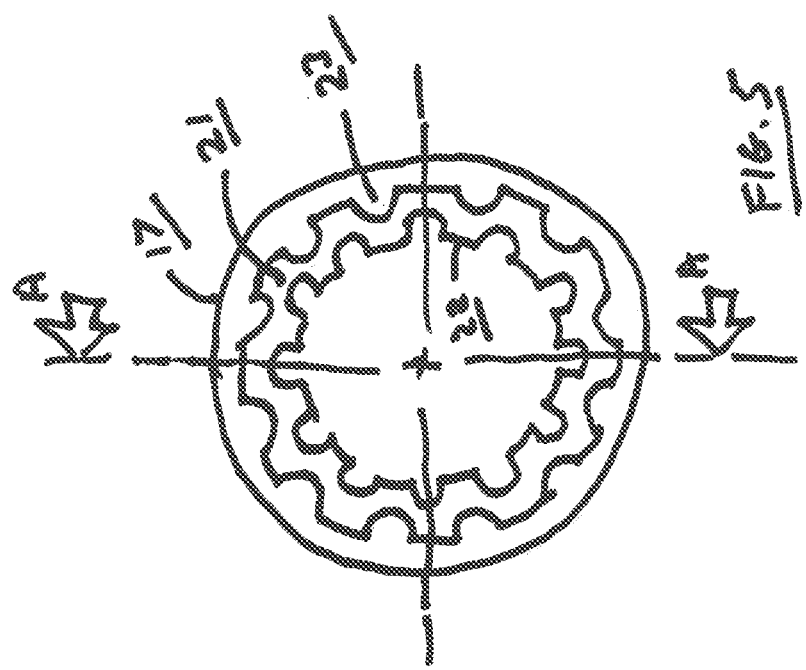
FIG. 5 shows a plan view of an embodiment of the dispensing nozzle.

FIG. 5 shows a detailed plan view of the dispensing nozzle (17), showing the design of liquid retention formation(21) by interlocking the design of the raised profile (23) and grooves (22) it can be shown that a greater surface area for the liquid retention formation(21) can be designed in order to create a much larger surface area than a single groove, this will ensure a much higher liquid retention to make sure the bubble making solution (25) will be available for the production a bubble (14) filled with a vapour (16), and will supply enough bubble making solution (25) to produce a very large bubble (14) filled with a vapour (16).

What is claimed is:

1. A device for creating a vapour filled bubble, comprising:
   a dispensing nozzle including a liquid retention formation for assisting the creation of a bubble;
   an air displacement element; and
   a vapour producing means comprising a vapour producing fluid and a means for heating the fluid;
   a reservoir or liquid storage tank for containing the vapour producing fluid;
   an absorbent material in contact with the vapour producing fluid in the reservoir or liquid storage tank; and
   a heating element in contact with a portion of the absorbent material located outside of the reservoir or liquid storage tank, wherein the heating element heats up to heat the vapour producing fluid within the absorbent material, and thereby create the vapour;
   wherein the heating element is a separate physical structure from the absorbent material;
   wherein the vapour producing fluid and absorbent material are configured such that the vapour producing fluid is constantly drawn into the absorbent material from the reservoir or liquid storage tank as the vapour producing fluid in the absorbent material is vapourized by the heating element, thereby maintaining constant contact between the heating element and the vapour producing fluid; and
   wherein the vapour producing means is located between the air displacement element and the dispensing nozzle, such that air flows from the air displacement element through the vapour producing means to deliver a vapour to the dispensing nozzle and the vapour does not pass through the air displacement element.

2. The device of claim 1, further comprising a controller suitable for varying a rate of airflow through the air displacement element.

3. The device of claim 1, wherein the heating element is powered by a high frequency signal provided by a controller.

4. The device of claim 1, wherein the liquid retention formation comprises interlocking raised profiles and grooves suitable for increasing surface area.

5. The device of claim 4 contained within a housing configured to enclose at least:
   the tank or reservoir;
   the heating element; and
   the air displacement element.

6. The device of claim 1 contained within a housing configured to enclose at least:
   the tank or reservoir;
   the heating element; and
   the air displacement element.

7. A kit comprising the device of claim 1, and a bowl suitable for containing a bubble solution and configured to accept the liquid retention formation.

8. The device of claim 1, wherein the absorbent material is removably attached to the device.

9. The device of claim 1, wherein the heating element is arranged outside a fluid containing portion of the reservoir or liquid storage tank.

10. The device of claim 1, wherein the vapour producing fluid comprises Propylene Glycol, Glycerin, or a combination of both Propylene Glycol and Glycerin.

11. The device of claim 10, wherein the vapour producing fluid further comprises a fragrance or flavour, such that an aroma is released when the vapour filled bubble is popped.

12. The device of claim 1, wherein the adsorbent material is non-metallic.

13. The device of claim 1, wherein the reservoir is removable.

14. The device of claim 1, wherein the device is handheld.

* * * * *